(12) United States Patent
Moy

(10) Patent No.: US 12,715,138 B2
(45) Date of Patent: Aug. 25, 2026

(54) ENVIRONMENTAL FACTOR-BASED SURFACE MAINTENANCE SYSTEM

(71) Applicant: Disney Enterprises, Inc., Burbank, CA (US)

(72) Inventor: Eric J. Moy, Orlando, FL (US)

(73) Assignee: Disney Enterprises, Inc., Burbank, CA (US)

( * ) Notice: Subject to any disclaimer, the term of this patent is extended or adjusted under 35 U.S.C. 154(b) by 308 days.

(21) Appl. No.: 17/963,374

(22) Filed: Oct. 11, 2022

(65) Prior Publication Data

US 2024/0116187 A1 Apr. 11, 2024

(51) Int. Cl.

| | |
|---|---|
| ***B25J 9/00*** | (2006.01) |
| ***B25J 9/16*** | (2006.01) |
| ***G06V 10/00*** | (2022.01) |
| ***G06V 10/70*** | (2022.01) |
| ***G06V 20/00*** | (2022.01) |
| ***G06V 20/54*** | (2022.01) |

(52) U.S. Cl.

CPC ........... *B25J 9/1697* (2013.01); *G06V 10/70* (2022.01); *G06V 20/54* (2022.01)

(58) Field of Classification Search

CPC ........ B25J 9/1697; G06V 10/70; G06V 20/54

See application file for complete search history.

(56) References Cited

U.S. PATENT DOCUMENTS

2016/0328979 A1* 11/2016 Postrel .................. H04W 4/029
2020/0225673 A1* 7/2020 Ebrahimi Afrouzi ........................ A47L 11/4011

* cited by examiner

*Primary Examiner* — Aaron G Cain
(74) *Attorney, Agent, or Firm* — Foley & Lardner LLP

(57) ABSTRACT

A system for performing surface maintenance based on one or more detected environmental factors for a surface monitored for maintenance. The system includes a surface monitoring assembly that monitors a surface for one or more environmental factors, such as a traffic pattern in a cleaning application, and the assembly may utilize one or more video cameras focused on a monitored surface along with video analytics software to process captured video to identify an environmental factor, such as heavy traffic, a spill, or the like. When an environmental factor is detected, the assembly passes this data to a maintenance control routine that processes the data to determine whether to vary the operations of an automated robot maintenance system provided in the system. The data can be used to define or modify a location, a time, and/or a parameter of a maintenance task or function (e.g., vacuuming versus wet mopping).

19 Claims, 4 Drawing Sheets

ENVIRONMENTAL FACTOR-BASED SURFACE MAINTENANCE SYSTEM

BACKGROUND

1. Field of the Description

The present description relates, in general, to automated robot maintenance systems such as cleaning systems and their varied uses to maintain surfaces such as floors, and, more particularly, to a system (and associated methods) for maintaining surfaces based on detected and/or monitored environmental factors affecting the surfaces.

2. Relevant Background

In recent years, it has become more and more common for maintenance to be performed in an automated or non-manual manner using robots (i.e., a machine operated based on a set of instructions to perform a function or task). For example, automated robot cleaning systems have become widely used in residential as well as industrial settings. The cleaning systems often include a cleaning robot such as an autonomous robotic vacuum cleaner that combines a vacuum floor cleaning system with sensors and robotic drives with programmable controllers and cleaning routines. While some are operated manually via a remote control, many cleaning robots are configured to have a self-drive mode that allows the machine to clean autonomously without human control.

Cleaning robots are now designed to provide a wide variety of cleaning functions, and an automated robot cleaning system may include one or more robots to perform the same or differing cleaning functions. Beyond mere vacuuming, cleaning robots may use spinning brushes to reach tight corners, and some include a number of cleaning features along with or instead of the vacuuming feature including wet mopping and/or scrubbers, sterilization components, and the like. Cleaning robots are often used due to their low noise, ease of use, and autonomous cleaning as well as other advantages.

One ongoing challenge with use of automated robot cleaning systems is scheduling of the cleaning functions. In some settings, it may be acceptable to have cleaning robots continuously moving within a space, but it is often preferable or required that the cleaning occur when other traffic is not present in the space such as when a warehouse is inactive or less active, when a performance space is not in use, and so on. Initial cleaning robots operate using random navigation, but newer models include a mapping ability to make cleaning more efficient during potentially limited windows of time for cleaning a space. In such cases, the cleaning robot may use gyro, camera, radar, and/or laser-guided systems to create a floor plan. Generally, the cleaning robot is operated to periodically clean the entire floor (or other surface) identified in the created floor plan based on a programmable cleaning schedule such as once a day or once a week.

SUMMARY

The inventor recognized that the importance of performing maintenance on surfaces when needed rather than merely on a predefined and, typically, fixed schedule. The "need" for maintenance could be identified by monitoring a particular surface, such as a floor, a street, a countertop, a window, a wall, a door knob or handle, or any other surface that needs to be maintained, and detecting when an environmental factor has affected the surface in a manner that may make it desirable to perform surface maintenance. For example, the maintenance performed may include surface cleaning, and floor areas of high traffic, whether foot or vehicle (or equipment) traffic, will get dirtier and require more frequent cleaning than other portions or areas of a particular surface (e.g., a warehouse floor, a hotel lobby or hallway, a performance stage, and so on). Scheduled cleanings in a conventional robot cleaning system clean a whole specified area at a predefined time that results in low and high traffic areas being equally cleaned.

To address this and other recognized problems, a system was designed for performing surface maintenance based on one or more detected environmental factors for a surface monitored for maintenance ("monitored surface"). The system includes a surface monitoring assembly that monitors a surface for one or more environmental factors (such as a traffic pattern in a cleaning application), and this assembly may utilize one or more video cameras focused on a monitored surface along with video analytics software to process captured video to identify an environmental factor (such as heavy traffic, a spill, or the like). Other sensors may be used to identify the environmental factors in some systems.

When an environmental factor is detected, the assembly passes this data to a maintenance control routine that processes the data to determine (e.g., by making one or more business decisions) whether to vary the operations of an automated robot maintenance system provided in the system. The data, in this way, can be used to define or modify a location, a time (or frequency), and/or a parameter of a maintenance task or function (e.g., type of maintenance required, how the type of maintenance is performed by a robot, and the like). In this manner, the scheduling and use of autonomous maintenance robots can be significantly improved to be more focused on actual needs and to provide more efficient use of resources such as available robots and maintenance materials.

The new system combines the two useful functions: (1) monitoring a physical space to quantify environmental factors that impact maintenance of subspaces or components within that space (herein referred to as monitored surfaces or surfaces being monitored to detect the environmental factor(s)); and (2) performing maintenance based on the specific measured environmental impacts. The monitoring may be performed by the system using machine vision (e.g., using cameras, lidar, and the like) or may be performed using other telemetry. The environmental factors being monitored may vary with some implementations monitoring for one or more of traffic, one-off incidents such as spills, weather impacts, sunlight, particulate pollution, contact with the monitored surface (e.g., with a food product such as chicken or pork, with a hand in the case of a doorknob or handle, and so on), and the like.

The maintenance task or function performed by the automated robot maintenance system may also vary and may include one or more of cleaning a surface, refinishing the surface, filling a crack, a hole, or other defect in the surface, coating the surface, or other repair task related to the monitored surface. In some examples, the system is used for performing outdoor space maintenance such as paving, painting, power washing, landscaping including grass cutting, and repairing real or faux rockwork or structures affected by weather and sun exposures as environmental factors that can be monitored by the system. Based on the detected environmental factor, the maintenance performance may be modified by output of the maintenance controller or control routine in a number of ways including by addressing less than the entire monitored surface (or space) (defining the location for task performance as a subset of the entire monitored surface), adjusting the frequency or duration of the maintenance task (adjusting the "time" variable of scheduling), and/or adjusting the procedure or materials used to perform the maintenance task (defining one or more parameters used to define the task).

More particularly, a system is provided for performing surface maintenance based on environmental factors. The system includes a robot maintenance system with at least one maintenance robot configured to perform a maintenance task. The system further includes a monitoring assembly with: (1) a sensor for monitoring a surface for presence of an environmental factor; and (2) an analytics module for processing output of the sensor to detect the presence of the environmental factor in a subset of the monitored surface. The new system also includes a maintenance controller configured to receive from the analytics module data associated with the environmental factor including a definition of the subset of the monitored surface. In response, the maintenance controller generates a control request for the robot maintenance system to modify or define performance of the maintenance task with a location based on the definition of the subset of the monitored surface.

In some implementations, the control request further modifies a timing of the performance of the maintenance task. In the same or other implementations, the control request modifies or defines at least one operational parameter for the maintenance task. In such cases, the operational parameter is a type of maintenance task, a robot functionality to perform the maintenance task, an intensity for performing the maintenance task, and/or one or more material used in performing the maintenance task. The environmental factor can be selected from: traffic, a spill, a weather impact, sunlight, particulate pollution, high or low temperatures, and human or object contact with the monitored surface.

In a surface cleaning application, the environmental factor is traffic or a spill, at least one maintenance robot is a cleaning robot, and the location is based on a traffic pattern for the traffic or a location of the spill determined by the analytics module. In this implementation, the sensor includes a video camera, and the analytics module performs video analytics upon video of the monitored surface captured by the video camera to determine the traffic pattern or occurrence of the spill on the monitored surface. The analytics module is further configured in some useful implementations to determine an origin for each piece of the traffic in the traffic pattern, and the maintenance task is modified or defined via the control request at least in part based on the determined origin for each piece of the traffic.

DETAILED DESCRIPTION OF THE PREFERRED EMBODIMENTS

Figure 1:
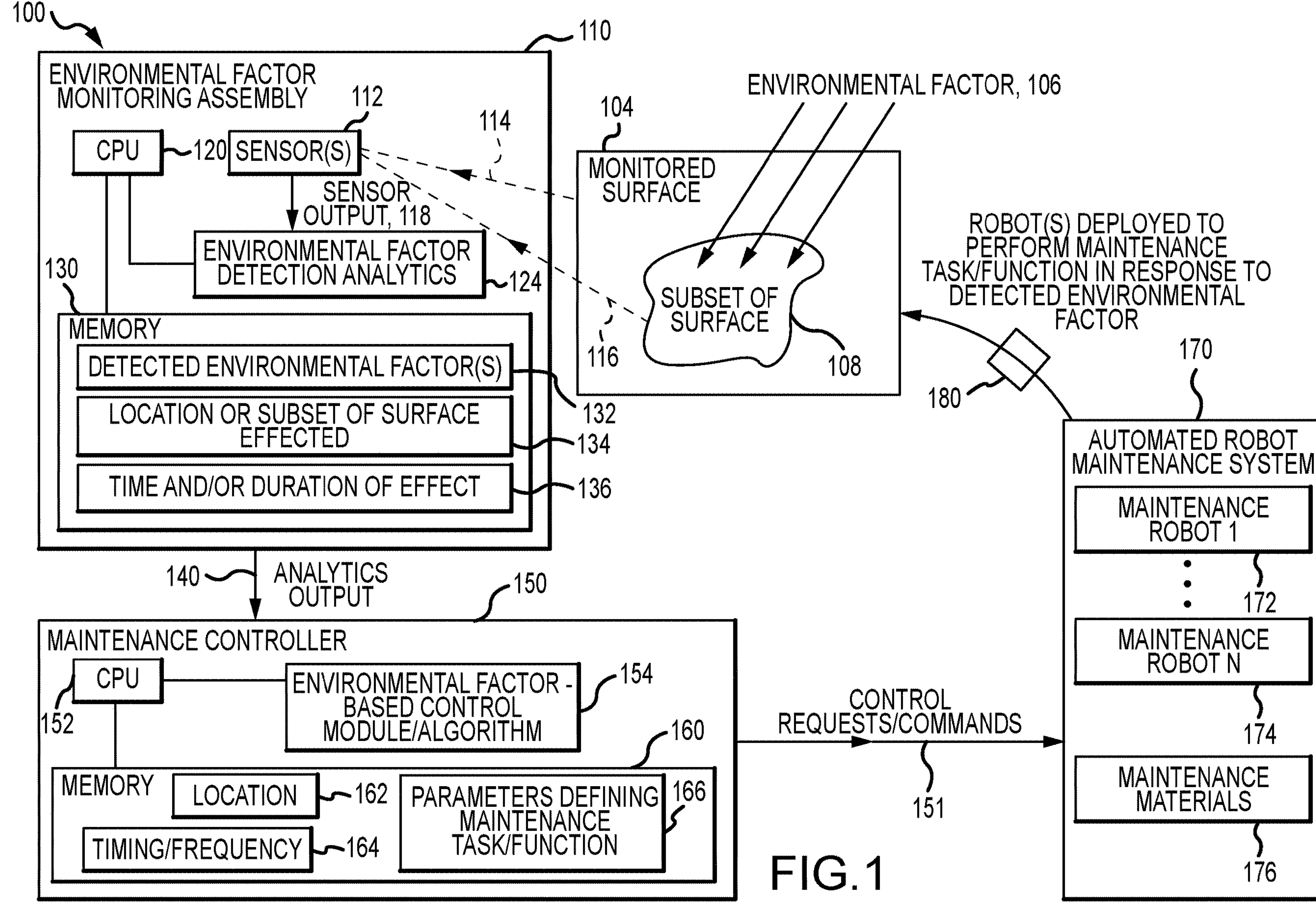
FIG. 1 is a functional block diagram of a system configured according to the present description for performing surface maintenance based on detection of an environmental factor affecting a monitored surface.

Briefly, the following description describes a system for performing maintenance based on the output of an environmental factor monitoring assembly. This assembly may include use of machine vision technology such as a video camera and video analytics to detect when and where an environmental factor that impacts maintenance of a surface has occurred. Business decision software, which may be labeled as a maintenance control algorithm or module, may take this assembly's output and process it to decide when and how to operate an automated robot maintenance system. As discussed with reference to FIG. 1 below, this may involve defining a type of maintenance (or parameters for a maintenance task), a time for the maintenance, and a location for the maintenance (e.g., a subset of the overall area of the monitored surface).

For example (as discussed with reference to FIG. 3 below), video cameras and computer/machine vision may be utilized in the monitoring assembly to determine levels of traffic (e.g., human, animal, and/or vehicle/equipment traffic) for a monitored area or surface. The system may include an autonomous robot cleaning system with one or more cleaning robot (vacuum robot, scrubber, robot, wet mopping robot, and so on). The system can then be configured to create the scheduling of use of the cleaning robot(s) and their operating parameters (e.g., severity or intensity of cleaning or the like) in a manner that is programmatically driven by the traffic data from the monitoring assembly.

In one implementation, a floor of a warehouse may be monitored with overhead video cameras, and the video analytics may determine that there are some intersections on the warehouse floor where there are far more forklifts driving over than in other portions or subsets of the monitored surface (i.e., all or a predefined subset of the warehouse floor). The warehouse floor, which may be concrete or other hard flooring material, gets dirt ground into it as a result of this heavier traffic, and floor traction can become much lower in these higher traffic areas. Given the determination of this environmental factor (i.e., traffic level is high in a particular intersection), the business logic (or "maintenance control module") can adjust the programming of the robot cleaning system or its robotic floor scrubber(s) to increase the cleaning frequency, the amount of water or cleaning materials used during cleaning, and/or brush depth or speed for this specific intersection. This allows the warehouse operator to clean this specific area more aggressively or effectively while cleaning the other lower traffic area in a more standard or conventional manner (e.g., a default cleaning levels and frequency). Hence, the new system (and associated methods) enables all areas to be more equally cleaned while making it more likely that the entire warehouse floor can be cleaned using the automated robot cleaning system within a particular allotted time (e.g., during off or low operational levels of the warehouse).

Similar monitoring can be used for periodic vacuuming or cleaning of hard or carpeted floors in high traffic visitor areas of a building or other space. Similarly, the environmental factor detected may be a spill, e.g., of milk, soda, or other liquid or of dry goods, on a hard or carpeted flooring, and the maintenance control module may be configured to call for prompt, rather than per later schedule, cleaning by a cleaning robot of the subset or portion of a monitored surface associated with the detected spill in a manner appropriate to the particular spill (e.g., vacuum for dry goods, scrubber or wet mop for liquid spills, or a combination thereof). Such cleaning (or performance of a maintenance task) in response to a detected environmental factor can reduce the risk of slipping or other problems associated with continued use of the monitored surface or space, whereas, in the past, the spill would not be addressed until a human operator or worker reported the spill and then it would typically be cleaned manually rather than via use of an automated robot cleaning system.

FIG. 1 is a functional block diagram of a system 100 configured according to the present description for performing surface maintenance based on detection of an environmental factor 106 affecting a monitored surface 104. As discussed above, it may be desirable to perform robot-based maintenance on a wide variety of objects and their surfaces. In this regard, the monitored surface 104 may take a wide variety of forms such as hard or carpeted flooring, a street, a stage, a wall, a window, a doorknob or handle, a countertop used to prepare food or other products, rockwork in a park or other setting, and so on. Each of these surfaces may have object, surface, and/or material specific environmental factors 106 that may cause damage or wear, may contaminate or make dirty, or otherwise affect the surface 104 to a degree or amount for which it is useful to perform one or more type of robot-based maintenance. In this regard, the environmental factor 106 may be any (or more than one) of the following: traffic, one-off incidents such as a spill, weather impacts, sunlight, particulate pollution, high or low temperatures, and human or object contact with the monitored surface (e.g., with a food product such as chicken or pork, with a hand in the case of a doorknob or handle, and so on).

The system 100 is shown to include an environmental factor monitoring assembly 110 that is configured to monitor the surface 104 for the presence of one or more predefined environmental factors 106 and also to determine a subset 108 of the monitored surface 104 affected (to the point where maintenance may be desirable) by the detected environmental factor 106. The detection of these two sets of data or information is shown at 114 and 116, respectively, and one or more sensors 112 are provided for performing the monitoring and/or detection functions of the assembly 110. For example, the sensor 112 may take the form of a video camera, a lidar device, or a telemetry device.

The monitoring assembly 110 includes a processor 120 executing instructions, code, or software to provide the functionality of an environmental factor detection analytics module 124. The assembly 110 also includes memory or data storage (or has access to such memory) 130, and the processor 120 manages data storage in and retrieval from the memory 130 such as from the module 124 and for communication as analytics output 140 to a maintenance controller 150. The module 124 performs analytics on the sensor output 118 to detect the environmental factor 106 and associated data is stored as shown at 132.

Further, the analytics performed are configured to determine a portion or subset 108 of the monitored surface 104 that is affected by the detected environmental factor 106 and for which maintenance is required or desirable. For example, a lobby floor of a hotel may be the monitored surface 104, and a spill may be the environmental factor 106. In this case, the sensor 112 would provide output 118 to the analytics module 124, which would detect both the spill (and its type such as dry or wet) and a subset 108 of the whole monitored surface 104 (the lobby floor) affected by the spill (e.g., a spill location that may be defined by the size of the spill plus a predefined added distance radially outward to ensure entire spill is cleaned up). In another example, a subset 108 of a rockwork wall 104 may be determined by the analytics to be exposed to sunlight over a particular level over a particular time period, which may indicate that maintenance (e.g., painting) may be desirable for this affected area or portion of the monitored surface 104.

Additionally, the detection analytics 124 processes the sensor output 118 to determine the time and/or duration of the environmental factor 106 (e.g., when a spill occurred, a time period for heavy traffic on a portion of a floor, a time of potentially contamination contact with a portion of a countertop or a doorknob/handle, and so on), and this information is also stored in memory 130 as shown at 136. The data generated by the analytics module 124 (as shown at 132, 134, and 136, at least) is communicated as analytics output 140 (in a wired or wireless manner) to a maintenance controller 140 for further processing and use in scheduling and controlling (or at least modifying in part) operations of an automated robot maintenance system 170.

The maintenance controller 150 includes a processor 152 executing code, instructions, or software to provide the functions of an environmental factor-based control module (or algorithm) 154 as described herein. The controller 150 further includes (or has access to) memory or data storage 160 that is managed by the processor 152. The control module 154 is configured to make business decisions on how to operate the robot maintenance system 170 to service the surface 104 based on the analytics output 140 (e.g., based on the environmental factor 106 and its impact on the affected portion or subset 108).

As shown, the control module 154 may use the output 140 to determine a location 162 to service or maintain (e.g., to perform repairs, painting, or cleaning), which may include or even match the location or subset of surface effected 134. Further, the control module 154 may process the output 140 to determine a timing or frequency 164 for performing a particular maintenance task, and this may include a request for immediate maintenance (such as for a spill or damage/conditions causing safety concerns), for a higher priority in an already defined maintenance window (e.g., perform maintenance task on affected subset 108 prior to other portions of surface 104), an increased frequency of the task for the affected subset 108, and so on. Further, the control module 154 may determine one or more parameters 160 useful in defining the maintenance task/function to be performed by one or more of the robots 172, 174 of the system 170. For example (as discussed more below with reference to FIG. 3), the spill may be determined to be a wet spill for which it is better to first perform scrubbing or wet mopping or a dry spill for which vacuuming at a particular setting may appropriate. In another example (again as shown better in FIG. 3), the intensity of the cleaning may be specified (e.g., speed or depth of scrubbers or the like). In other cases, the parameter may call for painting, coating, filling, or other operations to be performed by a robot with this type of maintenance task and/or other parameters set at 160 by the control module based on the detection and processing of the environmental factor 106 and 132.

The maintenance controller 150 may be configured to communicate (again, in a wired or wireless manner) all or portions of this data 162, 164, and 166 to the automated robot maintenance system 170 in control requests or commands 151. The system 170 includes one to many maintenance robots 172 to 174, which may have the same functionality or may have differing capabilities (e.g., a painting robot combined with a crack or hole filling robot, a wet or dry vacuum robot combined with a wet mop and/or scrubbing robot, and so on). Further, each may use none or a set of maintenance materials 176 (e.g., paint, filling materials, cleaning liquids, and so on). The control requests or commands 151 may include the data output (e.g., the parameters 166) from the control module 154 that may be used to defined or modify the maintenance task and what materials 176 to be used, and this may indicate which of the robots 172 or 174 that the system 170 deploys as shown at 180 to perform the maintenance task on the surface subset 108 (solely or as part of performing maintenance on other portions of the surface 104). Further, the location 162 and timing/frequency data 164 in the request 151 may be used by the system 170 to schedule when and where the deployment 180 occurs for the monitored surface 104, e.g., immediately for one subset 108 and with more frequency for another subset 108 (e.g., daily versus weekly for areas outside the subset 108 boundaries).

Figure 2:
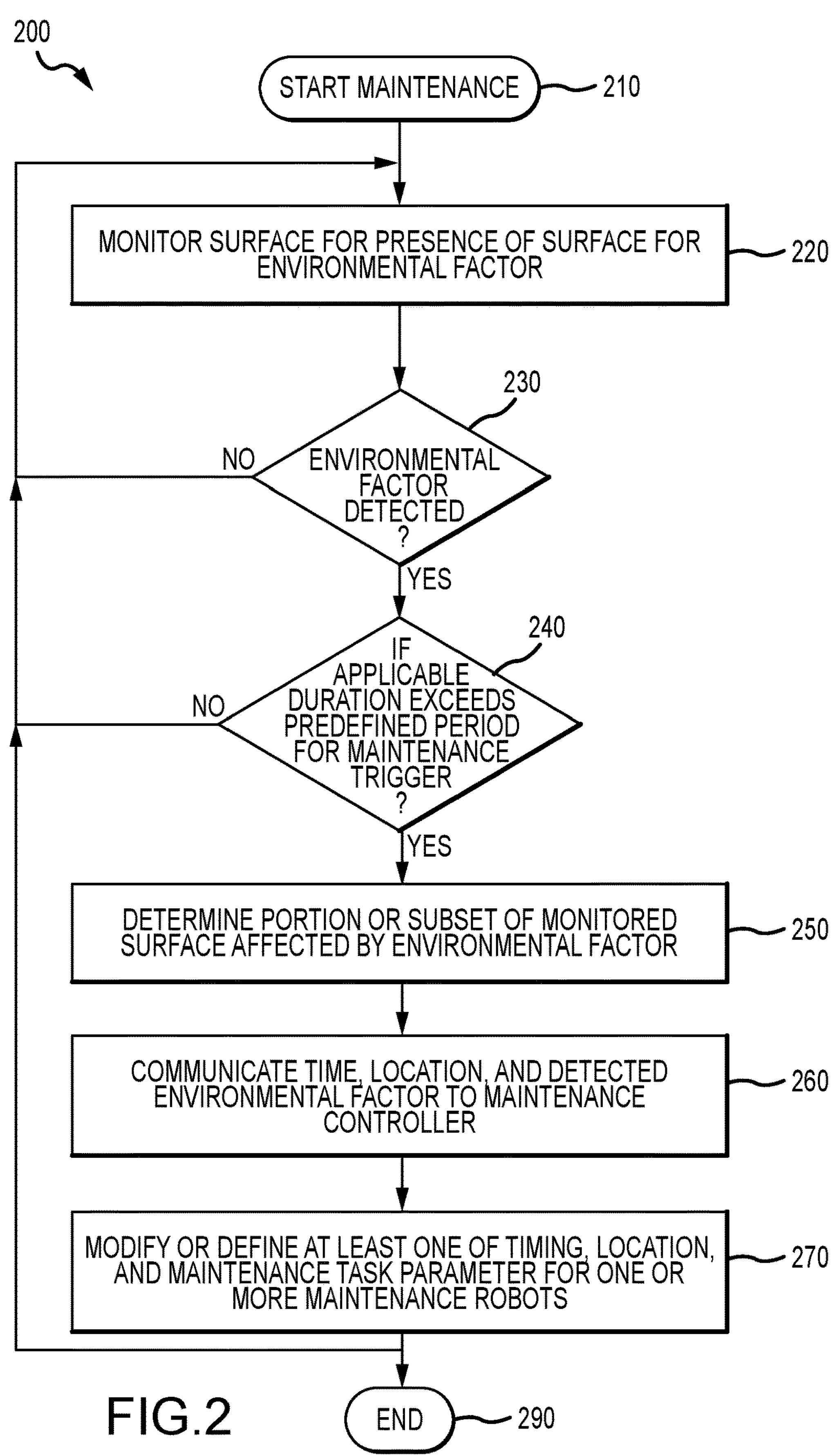
FIG. 2 is a flow chart of an environmental factor-based maintenance method of the present description such as may be implemented during operations of the system shown in FIG. 1.

FIG. 2 is a flow chart of an environmental factor-based maintenance method 200 of the present description such as may be implemented during operations of the system 100 shown in FIG. 1. The method 200 starts at 210 such as with installing one or more sensors, such as a telemetry device or a video camera, that are positioned and targeted or focused on a surface to be monitored (or a "monitored surface"). In some cases, sensors may already be installed, but their output can be used in monitoring for maintenance needs rather than only for its prior uses. For example, a video camera may be presently used for security but if it captures video of a floor its captured video can be processed to detect environmental factors such as a spill or traffic. Step 210 may also involve providing software to perform analytics upon the sensor output to detect an environmental factor and to identify an affected location or subset of the monitored surface from the sensor output. Further, step 210 may include providing software and/or hardware to make business decisions on how to modify use of maintenance robots (e.g., how to modify their scheduling) based on detected environmental factors, and this may involve providing a maintenance controller 150 as shown in FIG. 1 that is in communication both with the monitoring assembly 110 and the robot maintenance system 170.

The method 200 continues at 220 with monitoring a particular surface, such as a floor, a countertop, a work surface, a rockwork structure, a painted wall or other surface, a window, a doorknob/handle, or the like, for the presence of one or more predefined environmental factors. These may be any of the factors discussed above such as traffic, potentially contaminating contact, sunlight, hail, or the like. Typically, the monitoring step 220 will be performed using one or more detectors or sensors (such as sensor 112 in system 100 of FIG. 1) and processing the sensor output with software and/or hardware (such as with analytics module 124 in system 100 of FIG. 1). The method 200 continues at 230 with a determination of whether an environmental factor was detected (e.g., was heavy traffic found on a floor or not). If not, the method 200 continues with additional monitoring at 220.

If yes, the method 200 may at step 240 determine whether the environmental factor that was detected was present for a time period in excess of a predefined period or upper limit that may trigger a need or desire for maintenance of the monitored surface (or a portion thereof). This step may also be performed by the analytics module 124. As an example, an environmental factor may be weather or traffic related but neither of these may trigger a need for maintenance if short lived but only when a surface experiences their effects over an extended period (which may vary upon the surface and its materials, upon the environmental factor and its possible effects on the surface, and so on). If the triggering period has not been exceeded (if applicable as some environmental effects such as a spill may have not duration required), monitoring continues at 220 and 230 until the period is exceeded (or at least met).

When applicable and when the triggering period is exceeded as determined at 240, the method 200 continues at 250 with determining the portion or subset of the monitored surface that is affected by the detected environmental factor. This subset may be a relatively small portion of the overall surface area of the monitored surface such as an intersection in a warehouse, a southern facing portion of a rockwork structure, a working portion of a countertop, and so on, and identifying this subset of the monitored surface allows the maintenance performed in response to the detection of the environmental factor to be targeted and efficient. Then, at step 260, the time of detection (or factor occurrence), the location (e.g., the subset of the monitored surface identified in step 250), and the detected environmental factor (e.g., was this a spill, was a surface dirtied/contaminated, and so on) is communicated to a maintenance controller (such as controller 150 in system 100 of FIG. 1) for use in making one or more business decisions on whether and how to modify operations and/or scheduling of a robot maintenance system (such as system 170 in system 100 of FIG. 1).

At step 270, the robot maintenance system operates to schedule and deploy one or more maintenance robots in response to the data/information received (in control requests, commands, or the like) in step 260 to perform one or more maintenance tasks. This may involve modifying the scheduling/operations by changing timing, location, and/or a maintenance task parameter. For example, a robot may be immediately (or within a short time period) to address a spill or a damaged surface, and the location may be the subset of the monitored surface affected by the detected environmental factor rather than the entire monitored surface. Further, the maintenance task may be set by the parameters (which may dictate which of a fleet of maintenance robots is dispatched or deployed) and/or its performance modified or set such as intensity, type of maintenance material used, and so on. The method 200 may then continue at 220 with additional monitoring or end at 290.

Figure 3:
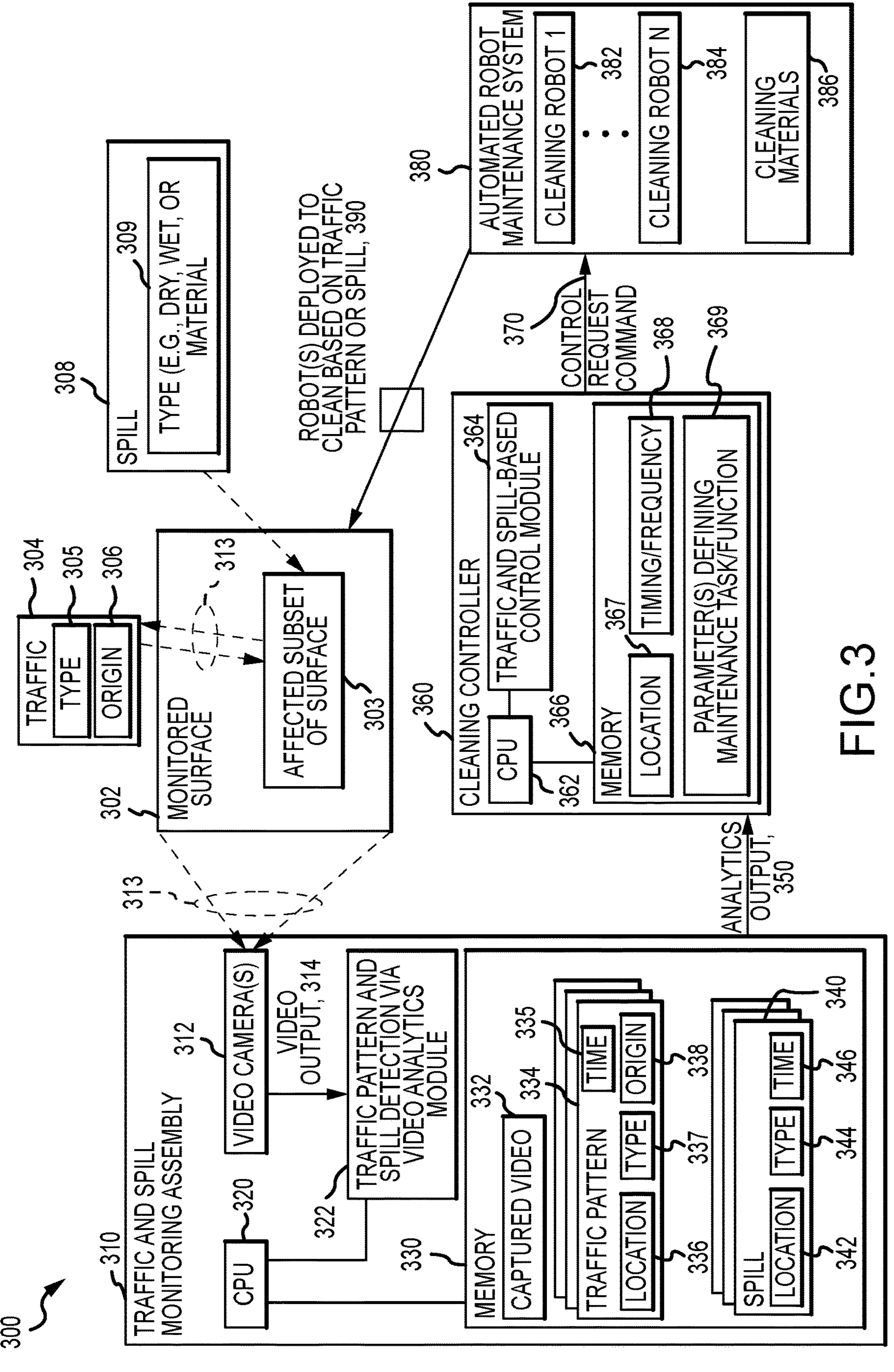
FIG. 3 is a functional block diagram of a system configured according to the present description for performing cleaning of a surface (i.e., an example of surface maintenance) based on detection of traffic pattern or a spill (i.e., an example of an environmental factor) on a monitored surface.

While there are many environmental factors that may be monitored and detected to enhance maintenance, it may be useful to describe at least two in more detail along with a particular implementation of the system 100 of FIG. 1. In this regard, FIG. 3 is a functional block diagram of a system 300 configured according to the present description for performing cleaning of a surface (i.e., an example of surface maintenance) based on detection of traffic pattern or a spill (i.e., an example of two possible environmental factors) on a monitored surface 302. The monitored surface 302 may be a surface such as a floor (e.g., of a warehouse, a performance space, a hotel or guest accommodations facility, or the like) or a surface upon which contamination or cleanliness is of higher concern (e.g., such as a food preparation surface, a doorknob/handle, and so on).

Traffic 304 may travel over or come into contact with the monitored surface 302 or at least a portion or subset thereof as shown at 303. This "traffic" may take the form of machinery or vehicles (e.g., a forklift, a passenger vehicle, a parade float trailer, and so on) or humans or animals (e.g., pets, livestock, and so on), while in other cases the "traffic" may be foodstuffs or nearly any object that may contaminate or dirty a surface 302 in a manner that triggers a need or desire for cleaning. Hence, the traffic 304 may be of differing types 305 that may cause it to have differing effects or require differing cleaning responses (e.g., a single person walking over a surface may differ in how dirty a surface becomes from a forklift driving over it). Further, the traffic 304 may come from differing places or origins 306, and this may also determine whether it makes a surface 302 require cleaning (e.g., did the animal come from outside or from another indoor space, did the forklift come from another inside space that is relatively clean or come from outside, a dock, or a cooler each of which may be considered dirtier spaces, and so on).

A spill 308 may occur upon a subset 303 of the monitored surface 302, and this spill 308 may have a type 309 that can define what types of cleaning actions are required. For example, the type 309 may be a dry spill or a wet spill, which can require differing cleaning tasks/functions (e.g., vacuum versus mop and/or scrubbing) to address. In other cases, the type 309 may be an indicator of the specific material that was spilled (e.g., flour (or another powdery substance), easily vacuumed items, non-sticky liquid, sticky liquid, and so on), which may be useful in selecting which cleaning task to perform to clean up the spill from the affected subset 303 of the monitored surface/space 302. Hence, the type 309 of the spill 308 may determine which cleaning robot 382 or 384 to deploy as shown at 390 (e.g., a vacuum robot versus a wet mop robot) and which (if any) cleaning materials 386 may be used by this deployed robot 390.

To monitor the surface 302, the system 300 includes a traffic and spill monitoring assembly 310 that includes in this example a video camera(s) 312 that is focused on the monitored surface 302. For example, a video camera 312 may be mounted on or near a facility's ceiling and be directed downward such that it captures the floor (or portions thereof) of the facility, which would be the monitored surface 302 in this example. More than one camera 312 may be used to provide an output 314 in the form of a video stream of the monitored surface 302 including the subset 303 affected by traffic 304 and/or a spill 308. In other embodiments, as discussed above with reference to system 100, different "sensors" or "detectors" may be used in place of the video cameras 312 and their outputs processed to detect patterns for the traffic 304 and existence of spills 308.

The monitoring assembly 310 further includes a processor 320 executing code or instructions (e.g., software) to provide the functions of a traffic pattern and spill detection module 322. The processor 320 also manages memory or data storage 330 (which may be local or remote to the processor 320 in assembly 310). The module 322 is configured to perform video analytics or machine vision processing, which is well-known so that detailed explanation is not provided or required. This video analytics is especially tuned to process the captured video 332 of the surface 302 over time to determine one or more traffic patterns 334 on the surface 302 and to determine when a spill 340 occurs on the surface 302.

As shown, the processor 320 stores (at least temporarily) captured video 332 from the camera(s) 312. This video 332 is processed, such through machine vision techniques, to determine one or more traffic patterns 334 based on identification of traffic 304 over the monitored surface 302. This processing determines the type 305 of the traffic 304, e.g., is it a vehicle, a human, an animal, an object, or the like, and stores this information at 337 for each traffic pattern 334. The type 305 of traffic 304 can indicate when a cleaning task should be performed such as a meat food product that may require cleaning of the subset 303 before next uses regardless of its origin whereas human traffic 304 may not require cleaning unless relatively heavy and/or from a "dirty" origin 306.

Further, the analytics module 322 is configured to determine the time 335 the traffic 304 moves through the traffic pattern 334 as well as its location. The time 335 may be useful in modifying the schedule of one or more cleaning robots 382, 384 such as to perform cleaning in a time window after the traffic pattern ends so that the robot 382 or 384 does not interfere with traffic 304 (e.g., stay out of the way of heavy human or vehicle traffic but clean up in first available window of time when traffic pattern ends or lightens to a predefined level). The location 336 of the traffic pattern 334 is generated by the module 322 and defines the affected subset of the surface 303 that may be subjected to a cleaning task. For example, this may be an intersection of two pathways in a warehouse, an area by a doorway/opening to a facility, a workstation of a countertop, or other portion of the monitored surface 302 that experiences higher levels of traffic 304 relative to other areas of the surface 302, which may require less intense or less frequent cleaning.

Additionally, the analytics module 322 is configured to determine the origin 306 of the traffic 304 and to store this in memory 330 for each traffic pattern 334 as shown at 338. The origin 306 can be significant for determining when and/or how to perform a cleaning task as the origin 306 may indicate the likelihood that the traffic 304 (human, animal, vehicle, object, and so on) moved from a relatively "dirty" location to the monitored surface. For example, the origin 306 of the traffic 304 may be a refrigeration space or an outdoor loading dock, and these locations may be known to tend to cause vehicle tires to become dirtier than indoor or other locations such that the origin 338 stored for traffic patterns 334 with such origins 338 may indicate more frequent and/or intense cleaning would be useful. In some embodiments, different origins are assigned different weights to assist in classifying a traffic pattern as one that may trigger a cleaning operation. For example, a clean indoor space may be an origin assigned a weight of 1 (on a scale of 1 to 10) whereas a muddy outdoor location may be assigned a 9 or 10 with general outdoor space weighted with a 5 (or the like), and such assignment of origin weights would allow the cleaning controller to more readily make business decisions on whether or not to modify the cleaning operations of the system 380 based on the origin of the traffic in the traffic pattern 334.

As shown, the analytics module 322 also is configured to process the captured video 332 with images of the monitored surface 302 to identify the occurrence of a spill 308. In response, a file or record 340 is stored in memory 330 with a set of information that may include the location 342 of the spill 308 (which may correspond to the subset of the surface 303 plus an added area to ensure the cleaning task cleans up the entire spill 308), the spill type 344, and the time 346 of the spill 308. As noted above, the spill 308 may have a type 309 such as of a particular material and whether it is dry or wet, and this type 309 can be determined by the module 322 based on processing of the captured video 332 as is known in the arts. The type data 344 recorded in each spill record/file 340 can be useful in selecting a cleaning robot 382 or 384 based on its functions as well as cleaning materials 386 that may be useful. The time 346 of the spill 308 on surface subset 303 can also be useful in making business decisions on when to schedule a robot 382, 384 for deployment to perform a cleaning task to address the spill 308, e.g., immediately, when a robot with proper functions is available, when a cleaning window for the surface 302 is opened, and so on.

The system 300 includes a cleaning controller 360 configured to communicate with an automated robot cleaning system 380 (such as via one or more API made available by the system 380). The monitoring assembly 310 is configured (such as with coding of the module 322) to transmit in analytics output 350 all or portions of the traffic pattern data 334 and spill data 340 generated by the analytics module 322. The cleaning controller 360 includes a processor 362 that executes instructions or code (or runs software) to provide the functions of a traffic and spill-based control module 364, and the processor 362 also manages memory/data storage 366 (which may be local or remote).

In general, the control module 364 is configured to process the analytics output 350 and to make one or more business decisions to modify or define operations of the cleaning system 380 via issued control requests or commands (e.g., communications via the API of the system 380 or the like). Particularly, the control module 364 may determine, based on the traffic pattern 334 and/or spill 340 in the output 350, that it is desirable to modify the scheduling or operations of the cleaning system 380. As shown in FIG. 3, this may include modifying or defining the location 367 of cleaning task performed by the system 380 to match or at least include the affected subset of the surface 303. Additionally, the control requests 370 may include timing and/or frequency 368 for one or more cleaning tasks performed by the cleaning system 380 such as to promptly clean up a spill 308 in area 303 or to more frequently (than other portions of the monitored surface 302) the subset of the surface 303 in response to a traffic pattern 334 indicating heavier traffic and/or traffic from a dirtier origin.

Further, the control module 364 may process the analytics output 350 to modify or define one or more parameters 369 that are used by the cleaning system 380 to perform one or more cleaning tasks. This may involve initially the type of task to be performed such as a vacuum operation or a wet mop/scrubbing operation. These parameters may also indicate whether the vacuum operation is on a hard surface or a carpeted/textured surface and/or whether the wet mop/scrubbing operation should be performed at a particular depth or intensity (e.g., scrubber rotation speeds), and/or whether particular cleaning materials 386 should or could be used in the cleaning task. Note, in some implementations, the parameters 369 define at a higher level how to modify or perform a task and intelligence within the system 380 (not shown) makes final decisions on how to perform the task. For example, the parameter 369 may indicate a wet mop is desirable while the cleaning system determines which robot 382, 384 to deploy and how it is operated to perform the requested wet mopping.

In response to the control requests/commands 370, the cleaning system 380 operates to deploy one or more of the robots 382, 384 to perform a cleaning task based on the monitoring performed by the monitoring assembly 310 as shown at 390. The deployed robot 390 is directed to location 367 to perform the cleaning task in the affected subset 303 of the monitored surface 302 at a time set or at least adjusted based upon the timing/frequency 368 in the control request/command 370. Further, the deployed robot 382, 384 performs the cleaning task based on the operational parameters 369 such that the task is performed based upon a detected traffic pattern 334 or spill 340 on the monitored surface 302.

Figure 4:
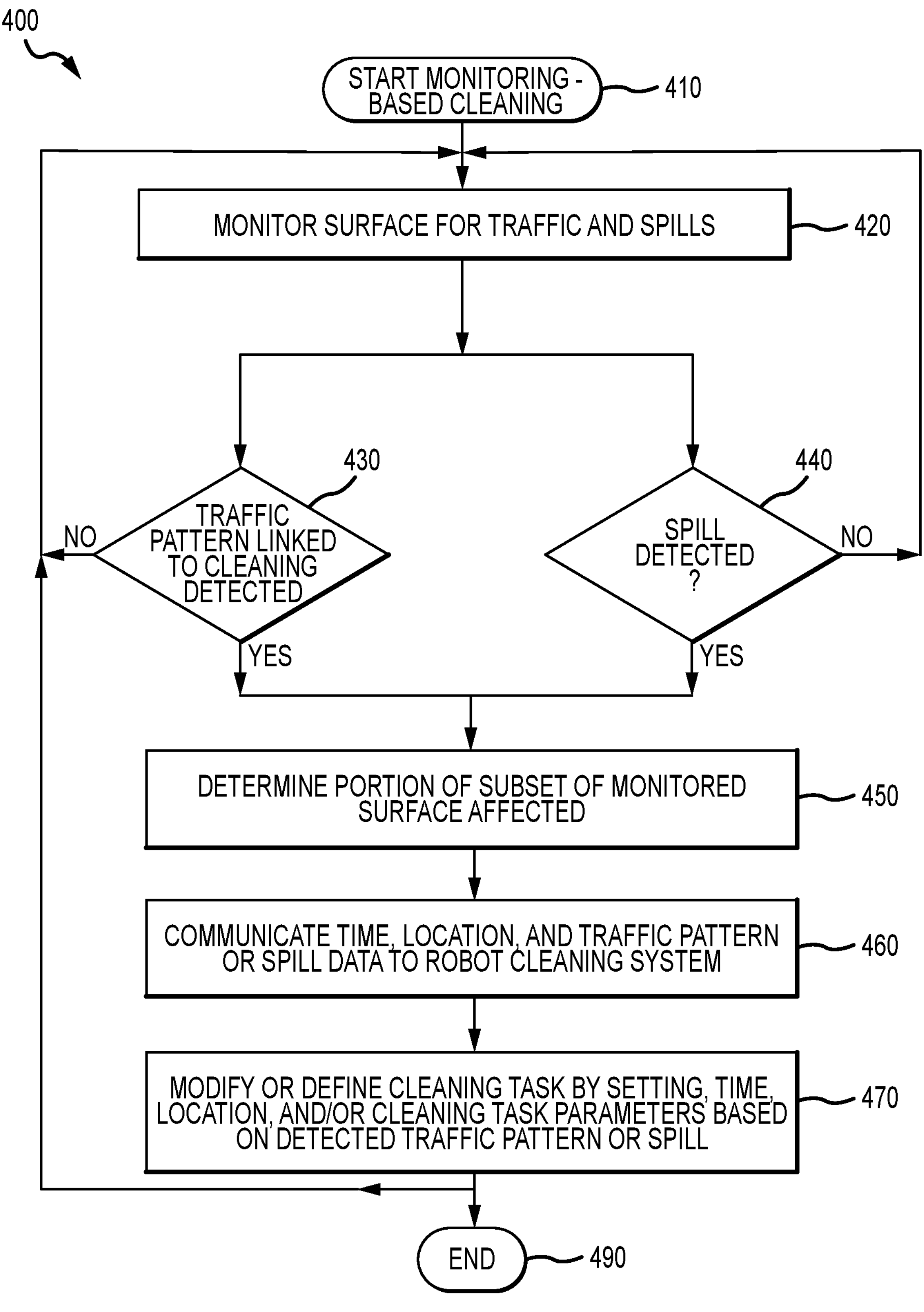
FIG. 4 is a flow chart of a traffic and spill-based surface cleaning method of the present description such as may be implemented during operations of the system shown in FIG. 3.

FIG. 4 is a flow chart of a traffic and spill-based surface cleaning method 400 of the present description such as may be implemented during operations of the system 300 shown in FIG. 3. The method 400 starts at 410 such as installing sensors such as video cameras 312 to capture video 314 with images of a monitored surface 302 or establishing a communication feed for a video analytics module such as module 322 shown in FIG. 3 to obtain access to the video output 314. Further, step 410 may involve installing a video analytics module adapted to identify traffic patterns and/or spills within a video stream.

The method 400 continues at 420 with operating the monitoring assembly 310 to monitor the surface(s) 302 for traffic and for spills. At 430, the method 400 checks to see if a traffic pattern has been identified that is identified as being linked to a cleaning trigger. If not, the method 400 continues at 420 with additional monitoring. If yes, the method 400 continues at step 450. Step 430 may be optional as in some implementations of the method 400 all traffic patterns are passed along to the processing steps 450-470. However, in some implementations, step 430 is performed to avoid calling for changes in cleaning schedules for relatively light traffic or traffic from relatively clean origins. In step 430, the analytics module 322 may determine that the traffic pattern 334 does not rise to the level of one that should trigger a cleaning task but is considered average or expected traffic (or low traffic), and these traffic patterns may be stored in memory 330 as shown at 334 but not passed to the cleaning controller (or in some cases, it will be the cleaning controller 360 being configured to perform step 430 to determine which traffic patterns 334 should trigger a cleaning operation/task be performed or a schedule modified).

At step 440, the method 400 involves determination of whether a spill has occurred and been detected by the video analytics module 322. If not, monitoring continues at 420. If a spill is detected, the method 400 continues at 450. As with traffic patterns, a "spill" triggering cleaning may be defined in a manner to avoid over detection such as to avoid defining a smaller occurrence resulting in any changes to the operations of the cleaning system. For example, a person dropping a single piece of dry trash may not necessarily be categorized as a "spill" requiring cleaning attention whereas a person dropping a bottle of liquid that breaks would typically be and call for a wet cleanup operation combined with picking up of the bottle pieces.

Then, at step 450, the method 400 involves determining the portion or subset of the monitored surface that is affected by the traffic pattern or the spill. This subset may include all or portions of the affected subset 303 of the monitored surface 302 and may include additional portions of the surface 302 to ensure a complete cleanup from the traffic or spill. At step 460, the method 400 continues with communicating the time, location, and other traffic pattern or spill data (e.g., the type 337, 344, the origin 338, and so on) to the cleaning controller 360 and/or cleaning system 380. In step 470, the operation of the cleaning system 380 is modified or defined (e.g., a cleaning task performed by one or more robots 382, 384) by setting the timing/frequency, location and/or cleaning task parameters based on the detected traffic pattern (or its associated data) or detected spill (or its associated data). Typically, one or more robots will be deployed (as shown at 390 in FIG. 3) in or as a result of performance of step 470. In step 470, the business intelligence involved in modifying or defining the cleaning operation contained in the control request 370 often will be performed in the cleaning controller 360, while the determination of which robot 382, 384 and what cleaning material 386 is determined in the cleaning controller 380. The method 400 may then continue with additional surface monitoring at 420 or end at 490.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

For example, the above description highlighted the new system and methods for use in surface cleaning using cleaning robots, but this is one non-limiting example of maintenance that can be performed based on monitored environmental factors. In a rockwork maintenance application that may be useful in theme park and other settings, an infrared (IR) camera may be used to monitor the temperature of a rockwork surface or the IR camera or other sensor may be used to detect reflected solar radiation or IR intensity (e.g., exposure above certain levels or a period of time or the like). The maintenance control module may then use this detected environmental factor to determine when maintenance (such as painting or coating) is to be performed and on which portions or subsets of the overall monitored surface. In a hotel or similar setting, a camera's output may be processed to monitor traffic and spills (or other environmental factors), and, in response, the maintenance control routine or module may modify or control operations of an autonomous robot cleaning system with a time, location, and/or task performance parameter selected based on the detected environmental factor (e.g., a spill in a hallway requiring immediate attention for a small subset of the monitored floor).

I claim:

1. A system for performing surface maintenance based on environmental factors, comprising:

a robot maintenance system comprising at least one maintenance robot configured to perform a maintenance task;

a monitoring assembly comprising:

a sensor having a video camera configured to monitor a surface for presence of a plurality of environmental factors, including at least traffic, and an analytics module configured to determine, based on output of the sensor, at least one environmental factor in a subset of the monitored surface, and a duration of the at least one environmental factor, and an origin for the at least one environmental factor such that a weight can be applied to the origin that corresponds with a classification associated with the origin; and a maintenance controller in communication with the monitoring assembly and configured to:

identify a material of the subset of the monitored surface;

determine an effect the at least one environmental factor has on the material of the subset of the monitored surface;

determine a triggering period based on the material of the subset of the monitored surface and the effect the at least one environmental factor has on the material;

determine the duration of the at least one environmental factor exceeds the triggering period;

determine the weight applied to the origin exceeds a weight threshold; and generate, responsive to determining that the duration of the at least one environmental factor exceeds the triggering period and that the weight applied to the origin exceeds the weight threshold, a control request for the robot maintenance system, wherein the control request modifies or defines performance of the maintenance task at a location.

2. The system of claim 1, wherein the control request further modifies a timing of the performance of the maintenance task.

3. The system of claim 1, wherein the control request further modifies or defines at least one operational parameter for the maintenance task.

4. The system of claim 3, wherein the at least one operational parameter comprises a type of maintenance task, a robot functionality to perform the maintenance task, an intensity for performing the maintenance task, or one or more materials used in performing the maintenance task.

5. The system of claim 1, wherein the plurality of environmental factors further comprise a spill, a weather impact, sunlight, pollution, temperature, or an object in contact with the monitored surface.

6. The system of claim 1, wherein the plurality of environmental factors further comprise a spill, wherein the at least one maintenance robot is a cleaning robot, and wherein the location is based on a traffic pattern for the traffic or a location of the spill determined by the analytics module.

7. The system of claim 6, wherein the analytics module is further configured to determine the origin for at least a portion of the traffic in the traffic pattern.

8. A method of maintaining a surface based on detection of environmental factors affecting the surface, comprising:

operating a sensor to monitor the surface and generate sensor output;

detecting, based on the sensor output, an environmental factor affecting a subset of the surface and an origin for the environmental factor;

applying a weight to the origin that corresponds with a classification associated with the origin;

identifying a material of the subset of the surface;

determining an effect the environmental factor has on the material of the subset of the surface;

determining a triggering period based on the material of the subset of the surface and the effect the environmental factor has on the material of the subset of the surface;

determining the environmental factor affects the subset of the surface for a time period in excess of the triggering period; and modifying, responsive to determining that the time period is in excess of the triggering period and that the weight applied to the origin exceeds a weight threshold, operations of one or more maintenance robots to perform a maintenance task on the subset of the surface.

9. The method of claim 8, further comprising modifying a time for performing the maintenance task in response to detecting the environmental factor.

10. The method of claim 8, further comprising modifying or defining one or more parameters associated with the maintenance task based on the environmental factor.

11. The method of claim 10, wherein the one or more parameters comprise a type of maintenance task, a robot functionality to perform the maintenance task, an intensity for performing the maintenance task, or one or more materials used in performing the maintenance task.

12. The method of claim 8, wherein the environmental factor comprises traffic, a spill, a weather impact, sunlight, pollution, temperature, or an object in contact with the monitored surface.

13. The method of claim 8, wherein the environmental factor is traffic or a spill, wherein the one or more maintenance robots are cleaning robots, and wherein the subset of the surface is determined based on a traffic pattern for the traffic or a location of the spill.

14. The method of claim 13, wherein the sensor output comprises video of the surface captured by a video camera, and wherein detecting the environmental factor and the origin comprises performing video analytics on the video of the surface captured by the video camera to determine the traffic pattern or occurrence of the spill on the surface.

15. The method of claim 13, wherein detecting the origin further comprises determining the origin for at least a portion of the traffic in the traffic pattern.

16. A robot cleaning system, comprising:

a cleaning robot;

a sensor configured to capture data associated with a monitored surface;

an analytics module configured to:

process the data captured by the sensor to detect a traffic pattern for traffic on the monitored surface;

determine an origin for at least a portion of the traffic in the traffic pattern; and apply a weight to the origin that corresponds with a level of cleanliness associated with the origin; and a controller configured to:

determine the weight applied to the origin exceeds a weight threshold;

modify, responsive to determining the weight applied to the origin exceeds a weight threshold, a cleaning task for the cleaning robot to perform, wherein modifying the cleaning task includes modifying at least one of a timing of the performance of the cleaning task, a location of the performance of the cleaning task to include a subset of the monitored surface associated with the traffic pattern, or a parameter defining operations of the cleaning robot while completing the performance of the cleaning task; and control the cleaning robot to perform the modified cleaning task based on the weight applied to the origin exceeding the weight threshold.

17. The robot cleaning system of claim 16, wherein the sensor comprises a video camera, wherein the data comprises video of the monitored surface, and wherein the analytics module is configured to analyze the video of the monitored surface to determine the traffic pattern.

18. The robot cleaning system of claim 17, wherein the analytics module is further configured to determine a type of each element of the traffic in the traffic pattern, and wherein the type comprises human foot traffic, vehicle traffic, animal traffic, or object traffic.

19. The robot cleaning system of claim 16, wherein the origin is determined from a plurality of predefined origins, each predefined origin having an assigned weight related to a level of cleanliness, and wherein the assigned weight is used in determining a timing or operating parameter for the cleaning task.

* * * * *